(12) United States Patent
Moulsley et al.

(10) Patent No.: US 9,301,316 B2
(45) Date of Patent: Mar. 29, 2016

(54) SCHEDULING REQUEST ENABLED UPLINK TRANSMISSION

(71) Applicant: FUJITSU LIMITED, Kawasaki-shi, Kanagawa (JP)

(72) Inventors: Timothy Moulsley, Caterham Surrey (GB); Milos Tesanovic, Harrow (GB); Paul Bucknell, Brighton (GB); Yoshiaki Ohta, Kawasaki (JP); Matthew Webb, London (GB)

(73) Assignee: FUJITSU LIMITED, Kawasaki (JP)

( * ) Notice: Subject to any disclaimer, the term of this patent is extended or adjusted under 35 U.S.C. 154(b) by 133 days.

(21) Appl. No.: 14/162,015

(22) Filed: Jan. 23, 2014

(65) Prior Publication Data

US 2014/0133447 A1    May 15, 2014

Related U.S. Application Data

(63) Continuation of application No. PCT/EP2012/065445, filed on Aug. 7, 2012.

(51) Int. Cl.
*H04W 72/12*    (2009.01)

(52) U.S. Cl.
CPC ...... *H04W 72/1278* (2013.01); *H04W 72/1284* (2013.01)

(58) Field of Classification Search
None
See application file for complete search history.

(56) References Cited

U.S. PATENT DOCUMENTS

| 8,644,867 | B2 | 2/2014 | Aiba et al. | |
| 2005/0220042 | A1 | 10/2005 | Chang et al. | |
| 2006/0072503 | A1 | 4/2006 | Kim et al. | |
| 2009/0109908 | A1 | 4/2009 | Bertrand et al. | |
| 2010/0098011 | A1* | 4/2010 | Pelletier et al. | 370/329 |
| 2011/0026478 | A1* | 2/2011 | Lee et al. | 370/329 |
| 2011/0243014 | A1* | 10/2011 | Lee et al. | 370/252 |
| 2012/0069805 | A1* | 3/2012 | Feuersanger et al. | 370/329 |
| 2012/0100864 | A1* | 4/2012 | Susitaival et al. | 455/450 |

FOREIGN PATENT DOCUMENTS

| EP | 1643694 | 4/2006 |
| KR | 10-2006-0044535 A | 5/2006 |
| WO | 2011053441 | 5/2011 |

OTHER PUBLICATIONS

Notice of Preliminary Rejection issued for corresponding Korean Patent Application No. 10-2014-7001714 mailed on Jan. 21, 2015 with an English translation.
International search report issued for corresponding international application No. PCT/EP2012/065445, mailed Oct. 17, 2012.

(Continued)

*Primary Examiner* — Gary Mui
(74) *Attorney, Agent, or Firm* — Myers Wolin, LLC

(57) ABSTRACT

The present invention refers to transmission method in a mobile communication system (1) comprising a base station (20) and a terminal (10) for transmitting transmission data to the base station. In order to provide a more efficient transmission procedure, a method is provided, in which the terminal transmits a message to the base station indicating that an uplink transmission resource is to be used by the terminal; and further information is provided by the terminal to the base station.

14 Claims, 14 Drawing Sheets

(56) References Cited

OTHER PUBLICATIONS

Notification of Reasons for Rejection issued for corresponding Japanese Patent Application No. 2014-525401 mailed on Aug. 18, 2015 with an English translation.

Office Action issued by the Korean Intellectual Property Office for corresponding Korean Patent Application No. 10-2014-7001714, mailed on Jul. 27, 2015, with English translation.

* cited by examiner

SCHEDULING REQUEST ENABLED UPLINK TRANSMISSION

This is a continuation of Application PCT/EP2012/065445, filed on Aug. 7, 2012, now pending, the contents of which are herein wholly incorporated by reference.

The present invention relates to a transmission method in a mobile communication system comprising a base station and a terminal for transmitting transmission data to the base station. The present invention further relates to a controller, a user terminal, to a base station and a computer program for use in said method.

Particularly, but not exclusively, the present invention relates to uplink communication procedures in accordance with the LTE (Long Term Evolution) and LTE-Advanced radio technology standards as, for example, described in the 36-series (in particular, specification documents 3GPP TS 36.xxx and documents related thereto), releases 9, 10 and subsequent of the 3GPP specification series. However, the present invention is also applicable to UMTS, WiMAX and other communication systems in which radio resource allocation requests are communicated from a terminal (also referred to as "user terminal", "user equipment", "mobile terminal" etc) to a base station.

A radio communication system typically comprises several geographical areas which are called "cells". The term "cell" generally refers to a radio network object as a combination of downlink and optionally uplink resources. A cell can be uniquely identified by, for example a user equipment (UE), from a (cell) identification that is broadcasted over the geographical area from an Access Point or base station (BS). A radio communication system, and the cells within it, may be in FDD (Frequency Division Duplex) or TDD (Time Division Duplex) mode. A base station may communicate with the user equipments assigned to the serving cell(s) using the frequency domain and time domain as communication resources. Further, communication resources may be allocated to the UEs of a cell in the spatial domain or code domain. Examples of radio communication systems are UMTS (Universal Mobile Telecommunications System), LTE, LTE-Advanced, WiMAX, also referred as "4G", and the like.

In a wireless communication system such as LTE and LTE-Advanced (referred to as "LTE-based systems" in the following, encompassing wireless communication systems with similar characteristics as those of LTE and/or LTE-Advanced), data channels are shared channels, i.e. for each transmission time interval, a new scheduling decision is taken regarding which UEs are assigned/allocated to which time/frequency/spatial/code etc resources during this transmission time interval. Several "channels" for data and signalling are defined at various levels of abstraction within the network. FIG. 1 shows some of the channels defined in LTE-based systems at each of a logical level, transport layer level and physical layer level, and the mappings between them. For present purposes, the uplink channels are of particular interest.

In FIG. 1, physical channels defined in the uplink are a Physical Random Access Channel (PRACH), a Physical Uplink Shared Channel (PUSCH), and a Physical Uplink Control Channel (PUCCH). An uplink physical channel corresponds to a set of resource elements carrying information originating from higher layers. In addition to the uplink channels, uplink signals such as reference signals, primary and secondary synchronization signals are typically defined. An uplink physical signal is used by the physical layer but does not carry information originating from higher layers. Modulation schemes supported in uplink are, for example, QPSK, 16 QAM and 64 QAM.

Hereby also incorporated by reference is also 3GPP TS 36.300 providing an overall description of the radio interface protocol architecture used in LTE-based systems and in particular section 5.2 of 3GPP TS 36.300 relating to uplink transmission schemes.

The physical channels in the uplink of LTE-based systems are described, for example, in 3GPP TS 36.211, section 5, which is in its entirety hereby incorporated by reference. User data and optionally also control signalling is carried on the Physical Uplink Shared Channel PUSCH. The physical uplink control channel PUCCH carries uplink control information such as a scheduling request (SR) and a channel quality indicator (CQI) report. As illustrated in FIG. 1, there is a downlink counterpart channel to the PUCCH, which is the Physical Downlink Control Channel (PDCCH) for carrying, in response to the scheduling request, an uplink scheduling grant. If PUSCH transmission occurs when the PUCCH would otherwise be transmitted the control information to be carried on PUCCH may be transmitted on PUSCH along with user data. Simultaneous transmission of PUCCH and PUSCH from the same UE may be supported if enabled by higher layers. The PUCCH may support multiple formats as indicated in 3GPP TS 36.211, section 5.4.

The Physical Random Access Channel PRACH is used to carry the Random Access Channel (RACH) for accessing to the network if the UE does not have any allocated uplink transmission resource. If a scheduling request (SR) is triggered at the UE, for example by arrival of data for transmission on PUSCH, when no PUSCH resources have been allocated to the UE, the SR is transmitted on a dedicated resource for this purpose. If no such resources have been allocated to the UE, the RACH procedure is initiated. The transmission of SR is effectively a request for uplink radio resource on the PUSCH for data transmission, as illustrated in FIGS. 2 and 3.

Accordingly, the UE then expects an uplink grant in order to transmit on PUSCH radio resource of which it may receive details either in a Random Access Response or dynamically on the PDCCH in response to the scheduling request SR. As described in 3GPP TS 36.321 relating to the Medium Access Control (MAC) protocol specification and being in its entirety hereby incorporated by reference, the SR is transmitted on the PUCCH for requesting the allocation of PUSCH resources for new data transmission. When the SR is triggered, it shall be considered as pending until it is cancelled. All pending SR(s) shall be cancelled when a MAC Protocol Data Unit (PDU) is assembled and this PDU includes a Buffer Status Report (BSR) which contains buffer status up to (and including) the last event that triggered a BSR, or when the UL grant(s) can accommodate all pending data available for transmission. The Buffer Status reporting procedure is used to provide the serving eNB (e-NodeB, also referred to as "base station" in the present specification) with information about the amount of data available for transmission in the uplink buffer(s) of the UE. A Buffer Status Report may be triggered if, for example, uplink data becomes available for transmission at the user terminal.

It is desirable to provide a more efficient transmission procedure for transmitting transmission data on an uplink radio resource from the terminal to the base station.

According to an aspect of the invention, a transmission method in a mobile communication system comprising a base station and a terminal is provided, wherein the terminal transmits a message to the base station indicating that an uplink transmission resource is to be used by the terminal, and further information is provided by the terminal to the base station.

Thus, transmission of the further information from the terminal to the base station is allowed without use of control signalling from the base station. In other words, the transmission of the message triggers the provision of the further information. Alternatively, the transmission of the message as well as the provision of the further information are initiated by the same trigger. Accordingly, the provision of the further information is not triggered by base station but by the terminal itself, and no control signalling from the base station is required by the terminal to allow provision of the further information.

Preferably, the message itself includes at least one of the following as the further information: information about the resource to be used for transmission of channel information by the terminal, and information about the resource to be used for transmission of transmission data by the terminal. The base station then receives, on the basis of receiving the message, the channel information and/or the data.

Accordingly, preferred aspects of the invention are based on the gist that a message is sent from the terminal to the base station and that sending the message provides further information to the base station. By providing the base station with further information, an exchange of control signalling can be reduced or omitted, thus rendering the transmission method for transmitting data from the terminal to the base station more efficient.

In an LTE communication system, the UE transmits data in the uplink using allocated PUSCH resources if an uplink radio resource of PUSCH is already allocated to the UE. The resources for these transmissions granted by the network are indicated to the UE using a control channel message sent using PDCCH. Such a message also indicates the transmission rate (i.e. modulation and code rate) of the allocated radio resources. In order to inform the network about the amount of pending data to be transmitted, so that an appropriate amount of resource can be allocated, the UE sends BSRs (buffer status reports) along with data transmissions via PUSCH.

However, if the UE has no PUSCH resources allocated, there is no means to send BSR. In that case, a scheduling request is triggered in the UE. This leads to the UE sending a Scheduling Request (SR) signal using pre-allocated SR resources on PUCCH. The SR indicates that the UE needs to be granted uplink radio resources on PUSCH. In the case that the UE not even has an SR resource allocation, the RACH procedure is initiated instead.

If the UE identifies the need for PUSCH resources and the SR transmission is triggered, the network typically responds by sending a PDCCH message with a relatively small resource allocation on PUSCH. A large allocation may be granted, but at this point the network does not have an accurate view of the UE buffer state or the uplink (UL) channel conditions, so a large resource grant could well be wasted. The same PDCCH message may trigger the UE sending, for example, an aperiodic sounding reference signal (SRS) in order to determine information about the uplink channel state at the base station and also trigger the UE sending a buffer status report. The following PUSCH transmission may then include BSR and the SRS may be transmitted as well. Upon successful reception, the network has knowledge of both UE buffer status and UL channel state. This allows then efficient scheduling of the PUSCH resources for the next UL transmission to match the UE traffic requirements.

However, the inventors of the present invention recognised that it is desirable to provide a more efficient transmission procedure from the terminal to the base station, in particular for transmission of, for example, SRS (as well as BSR) from the terminal to the base station following the triggering of an SR. The inventors recognised that any delay in the UE being granted sufficient UL resources increases the latency and reduces the throughput. Particularly in the case that a UE sends SR, there may be a significant delay before suitable PUSCH resources (for example, with appropriate transmission rate) are granted. This delay will be increased by any failure of SR detection by the network, failure of PDCCH reception at the UE (delaying SRS transmission and initial PUSCH allocation) or hybrid automatic retransmission request (HARQ) retransmission delays in reception of the PUSCH carrying BSR.

Aspects of the invention thus address allocating the UE with appropriate PUSCH resources as soon as possible after transmission data is present at the UE, and providing the network with channel information (such as, for example, UL channel state), transmission data information (such as, for example, UE buffer status) and if possible, and/or at least part of the transmission data itself (such as, for example, PUSCH data) more quickly or reliably. The terminal is thus enabled to transmit data to a base station more efficient, although no resources may yet have been granted by the network. Allocating an appropriate uplink transmission resource may be partly determined by the further information and partly by other information, such as previous signalling.

Preferably, the terminal provides the further information, such as, for example, channel information about a channel between the terminal and the base station and transmission data information about the transmission data of the terminal, together with the message to the base station for informing the base station and the network about the resources it requires or about the resources it intends to use. The base station may confirm or allocate an appropriate uplink transmission resource to the terminal on the basis of the received further information and notify the terminal about the allocated uplink transmission resource in a control message on the downlink. The terminal may then transmit the transmission data on this allocated uplink radio resource.

In addition or alternatively, if pre-allocated uplink transmission resources for data transmission are already available at the terminal, the terminal may immediately start transmitting the transmission data to the base station. Further in addition or alternatively, the base station may confirm (or forbid) the currently used uplink transmission resource to the terminal or may allocate a different uplink transmission resource to be used for the data transmission and notify the terminal accordingly. The terminal may then transmit the transmission data on the confirmed or on the different allocated uplink transmission resource to the base station. Therefore, a step of allocating the uplink transmission resource may be understood to be carried out at the terminal which actually uses a pre-allocated uplink transmission resource and/or to be carried out at the base station which confirms or re-allocates the uplink transmission resource. However, the invention is not limited to these embodiments, but also encompasses embodiments of allocating an uplink transmission resource at, for example, a higher layer network entity.

Within the present specification, the term "message" may refer to a "request" in the case, for example, that the terminal requests an uplink transmission resource to be allocated by the base station and/or the network, and may refer to a "indication" in the case, for example, that the terminal indicates to the base station which uplink transmission resource the terminal uses or intends to use.

Also, the term "further information" may refer to one or more items of information. Thus, the further information may be one signal, such as SRS, but it may also be two (separate) signals such as SRS and BSR. The term may also refer to one signal which actually provides information about SRS as well as BSR. Thus, the term "further information" is to be understood as to cover one item, a plurality of items and part of further information.

Preferably, the further information is channel information about a channel between the terminal and the base station, transmission data information about the transmission data of the terminal, and/or at least part of the transmission data to be transmitted from the terminal to the base station.

In a preferred embodiment, the further information is provided to the base station by a pre-configured transmission from the terminal to the base station. Thus, the further information may be transmitted via a pre-configured transmission channel and possible values of the further information may be pre-configured by control signalling from the base station to the terminal before the terminal is triggered to send the message, and correspond, for example, to different messages. Alternatively, the further information may be encoded by using one of a plurality of different pre-configured transmission setups. Thus, the further information is provided to the base station by selection of a particular pre-configured transmission from the terminal to the base station. The further information is indicated by selection of one of a number of different pre-configured transmission set-ups.

In a preferred embodiment, the message may include one or more signals which actually comprise the further information. In another preferred embodiment, the message may represent the further information by, for example, by a parameter of the transmission and/or the format and/or timing with which the message is transmitted from the terminal to the base station. These and other embodiments are further detailed below.

The user terminal may be pre-configured (which may be understood as also including "pre-allocated" and "pre-scheduled") with appropriate resources and parameters for enabling the terminal to quickly and reliably transmit the message as well as provide the further information. Preferably, the network or base station allocates scheduling request resources and/or parameters for a scheduling request to the terminal for enabling it to transmit the scheduling request as soon as it is triggered at the terminal. Similarly, the network or base station may configure the terminal with channel resources and/or parameters, transmission data resources and/or parameters for transmitting the channel information, transmission data information and/or the at least part of the transmission data itself as soon as it is available at the terminal.

For example, in a preferred embodiment, the terminal is configured with dedicated PUCCH resources for a scheduling request and with dedicated SRS resources/parameters which it uses when the network triggers an aperiodic SRS transmission. When a scheduling request is triggered, the UE transmits SR on the first available PUCCH resources for SR, and then SRS on the first available resources for aperiodic SRS after the SR transmission. The SRS provides the network with early information on UL channel conditions. When the network receives the SR it is aware that the UE will also send SRS, and thus requesting any other UEs to send SRS which may collide in the same resources can be avoided.

In another exemplary embodiment, the UE is configured with dedicated PUCCH resources for SR and with PUSCH resources/transmission parameters. When a scheduling request is triggered, the UE transmits SR on the first available PUCCH resources for SR, and then PUSCH on the first available resources after the SR transmission. The PUSCH contains BSR, providing the network with early information on UE buffer status. Potential delay can be reduced by not waiting for a PUSCH allocation signalled on the PDCCH. When the network receives the SR it is aware that the UE will also send PUSCH, and requesting any other UEs to send PUSCH which may collide in the same resources can be avoided.

In a preferred embodiment, the message includes at least one of the following: a scheduling request (SR) requesting an allocation of an uplink transmission resource, and a sounding reference signal (SRS) allowing determination of channel information about an uplink channel from the terminal to the base station, and the further information is provided by transmission of at least one of the following: channel state information (CSI) as channel information about a downlink channel from the base station to the terminal, a buffer status report (BSR) as the transmission data information about a buffer status of a transmission data buffer storing transmission data at the terminal, and/or transmission data.

In another preferred embodiment, the message is a scheduling request (SR) requesting an allocation of an uplink transmission resource and the further information is provided by transmission of a sounding reference signal (SRS) allowing determination of channel information about an uplink channel from the terminal to the base station.

Thus, embodiments of the present invention provide for transmission of additional signals as the further information, for example a Sounding Reference Signal (SRS) and/or a transmission data signal on PUSCH (optionally comprising Buffer Status Report (BSR), and/or Channel State Information (CSI)) without the need for further control signalling from the base station or the network. The resources for the additional signals may be pre-configured and the mere reception of the SR by the base station may thus indicate to the base station that reception of the one or more of the additional signals is to be expected.

Thus, an LTE network may perform sounding of the uplink channel (using SRS) and/or receive up-to-date UE buffer status (BSR) and/or CSI as soon as possible after a scheduling request is triggered. Latency (i.e. time delay to reach the required transmission rate) and overheads due to control channel signaling can be reduced, and power saving at the UE can be achieved.

A sounding reference signal (SRS) is a type of an uplink reference signal, which is described in further detail in 3GPP TS 36.211, section 5.5.3, which is in its entirety hereby included by reference. A SRS may be triggered by higher layer signalling or by specific Downlink Control Information (DCI) formats as described, for example, in 3GPP TS 36.213, section 8.2, which is in its entirety hereby incorporated by reference. DCI relates to control signalling messages transmitted on a Physical Downlink Control Channel (PDCCH) including, for example, uplink transmission grants for the PUSCH.

Radio resource related configurations for CQI Report, PUSCH, PUCCH, SR, and SRS may be defined in radio resource control information elements as set out in section 6.3.2 of 3GPP TS 36.331, which is in its entirety hereby incorporated by reference.

The SR and BSR protocols are further described in 3GPP TS 36.321, sections 5.4.4, 5.4.5, and 6.1.3, and the SR procedure for a terminal procedure for determining physical uplink control channel assignment is described in 3GPP TS 36.213, section 10, which is in its entirety hereby incorporated by reference.

In a preferred embodiment, the steps of (i) transmitting the message and (ii) providing the further information are carried out in different subframes and/or with a timing offset to each other.

Accordingly, the transmission of the message and the provision of the further information may be carried out with different timing. Preferably the triggering of the message (which is, for example, a scheduling request) at the UE may directly enable and trigger the provision of the further information such as SRS, or BSR or data on PUSCH. Transmission of SRS allows the network to measure the uplink channel state with minimal delay and to use this information in any response (for example, scheduling of uplink data transmission). Since a downlink transmission on PDSCH may follow an UL transmission on PUSCH (for example, in the form of a higher layer TCP/IP ACK), it is preferred for the UE to send CQI as soon as possible.

Preferred embodiments of signals following triggering of a scheduling request relate to the transmission of one or more of:
SR
SRS
PUSCH
(aperiodic) CSI on PUSCH; periodic CSI on PUCCH may already be available (if configured)

In a preferred embodiment, the step of transmitting the message includes at least one of the following:
transmitting subframe information from the terminal to the base station indicating a subframe in which the further information will be transmitted with respect to the transmission of the message, and
transmitting offset information from the terminal to the base station indicating a timing offset of the transmission of the further information with respect to the transmission of the message.

In a preferred embodiment, the subframe and/or the timing offset represents the further information.

In an exemplary embodiment, the UE may be configured to only transmit SRS as the message indicating a scheduling request which is represented in a particular subset of subframes (e.g. every Nth subframe with a given time offset). This may reduce the potential collision with SRS from other UEs. Also, the UE may be configured to only transmit a modified SR indicating additional information in a particular subset of subframes, for example every Nth subframe with a given time offset. Also, a time delay may be arranged between SR and SRS which may be defined by specification or configuration for indicating to the network that, upon receipt of the SR, the UE will also send SRS. Also, a timing offset between transmission of the message (such as SR) and provision of further information (such as SRS) may indicate a buffer status of the terminal.

In a preferred embodiment, the step of transmitting the message includes providing the further information, preferably indicated by a parameter of the message.

Thus, the further information may be provided by one or more parameters of the message. For example, in a preferred embodiment, only SRS (and/or at least one of CSI, BSR, and PUSCH) is transmitted as the message to the base station. Accordingly, the further information "scheduling request" is indicated by the message "SRS" to the base station. Thus, no SR resources are needed. It may thus not be necessary to transmit SR if another signal is transmitted instead (for example SRS).

In accordance with the embodiment, it may not be necessary to transmit a SR to the base station as the mere reception of channel information, transmission data information and/or the at least part of the transmission data itself may inform the base station about a request for or an indication of the allocation of an uplink transmission resource. Thus, the information that an uplink transmission resource allocation is requested or indicated may be encoded by the transmission of the message including the further information. For example, by transmitting a channel information signal and a transmission data information signal with a predetermined timing delay (offset) may represent a predetermined content of a scheduling request. Thus, the actual transmission of the scheduling request may not be necessary, but represented by the transmission of the message including the channel information signal and transmission data information signal. In another embodiment, a format of a scheduling request may be represented by transmitting the channel information and the transmission data information with a predetermined timing delay.

Preferably, the message represents the further information or a format thereof. Accordingly, the further information or the format thereof is encoded by the message, which is preferably a scheduling request. For example, different UE buffer states may be encoded in the SR and/or SRS transmission. Alternatively, triggering of SR also enabling transmission on PUSCH may allow the UE to send BSR and/or transmission data.

Preferred embodiments of indicating a buffer status of a transmission data buffer of the user terminal by transmitting with a particular configuration or explicit data with one or more of the following are:
SR; multiple SR resources may be configured
SRS; multiple SRS resources may be configured
PUSCH; BSR could be sent on PUSCH, along with some data and optionally CSI For example, in a preferred embodiment, different buffer status values (or priorities) may be indicated by an alternating sequence of SR signals (e.g. positive and negative).

Similarly, in another preferred embodiment, a scheduling request and the channel information (or the transmission data information) may represent the transmission data information (or the channel information). Other combination of scheduling request and information representing each other may be preferred as well.

In a preferred embodiment, if a second terminal transmits a second message to the base station indicating that a second uplink transmission resource is to be used by the second terminal and second further information is provided by the second terminal to the base station, the method further comprises:
allocating message resources for the message of the terminal and for the second message of the second terminal to be different from each other if further information resources of the further information of the terminal and of the second further information of the second terminal overlap with each other, and/or
configuring further information resources for the further information of the terminal and for the second further information of the second terminal to be non-interfering with each other if message resources of the message of the terminal and the second message of the second terminal overlap with each other.

In an exemplary embodiment, multiple UEs may be configured with SRS resources/parameters which overlap. Since UEs with potentially interfering SRS resources/parameters are preferably allocated different SR resources, the effect of collisions of interfering SRS transmissions from different UEs is mitigated. The network is able to identify collision cases and may ignore the SRS transmissions from different UEs.

In another exemplary embodiment, multiple UEs may be allocated the same SR resources. To reduce collision of SRS, UEs with SR resources in the same subframe are preferably configured with non-interfering SRS resources/parameters. The network is thus able to identify UEs transmitting on the same SR resources from the different received SRS.

In a preferred embodiment, the method further includes receiving, at the base station, transmission data transmitted from the terminal to the base station on the uplink transmission resource indicated by the further information.

In this embodiment, the message is an indication of the uplink transmission resource used by the terminal. The base station may thus immediately start receiving data on the uplink transmission resource. Also, the base station may confirm or forbid the currently used uplink transmission resource to the terminal and the terminal may then transmit the transmission data on the confirmed uplink transmission resource to the base station. Accordingly, allocating the uplink transmission resource may be understood to be carried out at the terminal which preferably uses a pre-allocated uplink transmission resource and/or to be carried out at the base station which confirms the used uplink transmission resource.

In a preferred additional or alternative embodiment to the latter embodiment, the method further includes allocating, at the base station, the uplink transmission resource on the basis of the further information and notifying the terminal about the allocated uplink transmission resource.

In this embodiment, the base station may allocate a different uplink transmission resource to be used for the data transmission and notify the terminal accordingly. The terminal may then transmit the transmission data on the different allocated uplink transmission resource to the base station. Therefore, allocating the uplink transmission resource may be understood to be carried out at the base station which re-allocates the uplink transmission resource.

In another aspect, the present invention relates to a controller for a controlling a transmission in a mobile communication system comprising a base station and a terminal, the controller comprising:
  a message transmission controller for controlling a transmission of a message from the terminal to the base station, wherein the message indicates that an uplink transmission resource is to be used by the terminal, and
  a further information provision controller for controlling a provision of further information by the terminal to the base station, without use of control signalling from the base station to allow transmission of the further information.

Preferably, the controller is included in the terminal for directly controlling the terminal to carry out the method as described herein. However, in another preferred embodiment, the controller is included in the base station (or in a network entity) and indirectly (remotely) controls the terminal by, for example, control signalling from the base station to the terminal for pre-configuring the terminal to carry out the method as described herein.

In another aspect, the present invention relates to a terminal of a mobile communication system comprising a base station and the terminal, the terminal comprising:
  a message transmitter for transmitting a message from the terminal to the base station, wherein the message indicates that an uplink transmission resource is to be used by the terminal, and
  a further information provider for providing further information by the terminal to the base station, without use of control signalling from the base station to allow transmission of the further information.

In another aspect, the present invention relates to a base station of a mobile communication system comprising the base station and a terminal, the base station comprising:
  a message receiver for receiving a message from the terminal, wherein the message indicates that an uplink transmission resource is to be used by the terminal, and
  a further information receiver for receiving further information provided by the terminal to the base station, without use of control signalling from the base station to allow transmission of the further information.

In another aspect, the present invention relates to a computer program (which may be stored to a computer-readable medium) comprising program code for causing a computer to carry out a method as described in the present application or to operate as a controller as described in the present application, a user terminal as described in the present application or a base station as described in the present application.

Preferred embodiments of the present application are described, by way of example, with reference to the accompanying drawings in which, FIG. 1 illustrates logic, transport and physical channels and the corresponding mapping thereof, FIG. 2 illustrates an example of a radio resource allocation signalling procedure of an LTE-based system, FIG. 3 illustrates an example of radio resource allocation signalling subframes of an LTE-based system, FIGS. 4a to 4d illustrate SR and SRS transmissions in accordance with embodiments of the present invention;

Unless otherwise indicated, the embodiments described below are described in the context of LTE, where the mobile communication system (also referred to as the "network") operates using FDD and comprises one or more base stations (also referred to as "eNodeBs"), each controlling one or more downlink cells, each downlink (DL) cell having a corresponding uplink cell. Each DL cell may serve one or more terminals (also referred to as "UEs") which may receive and decode signals transmitted in that serving cell.

Figure 1:
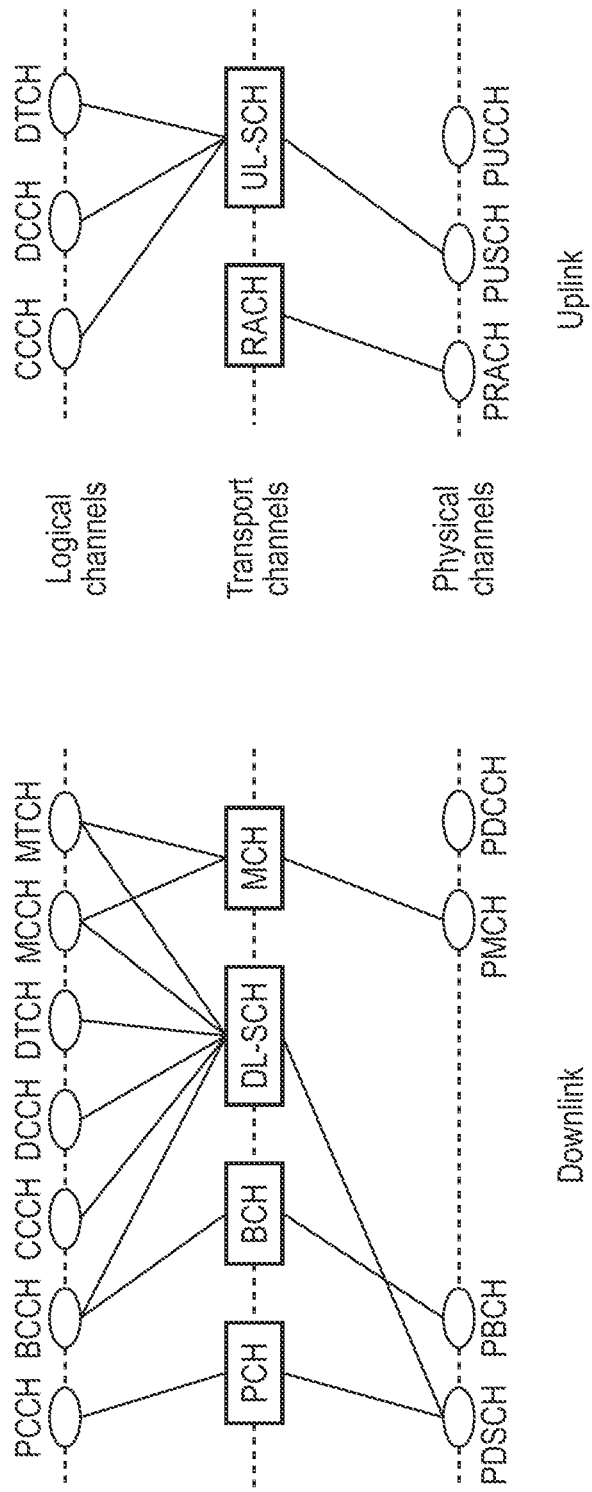
Figure 2:
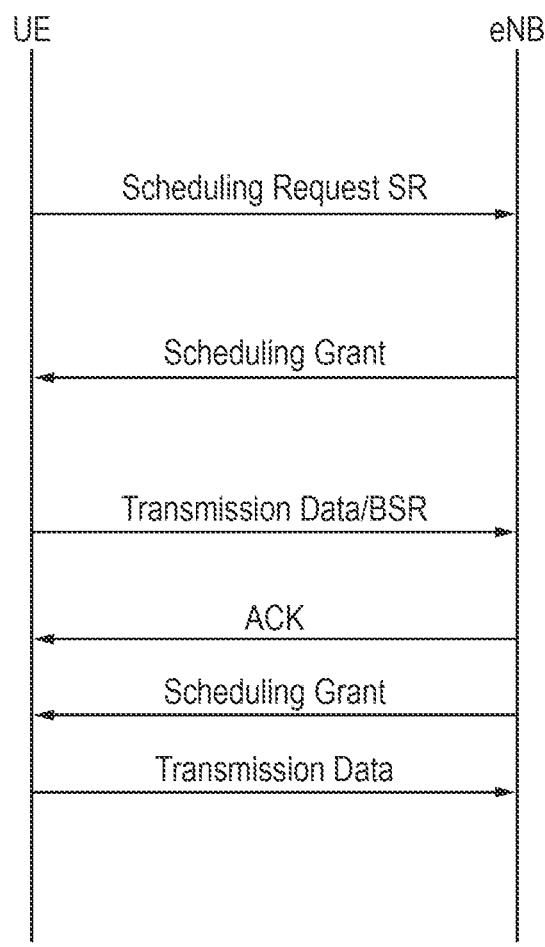
Figure 3:
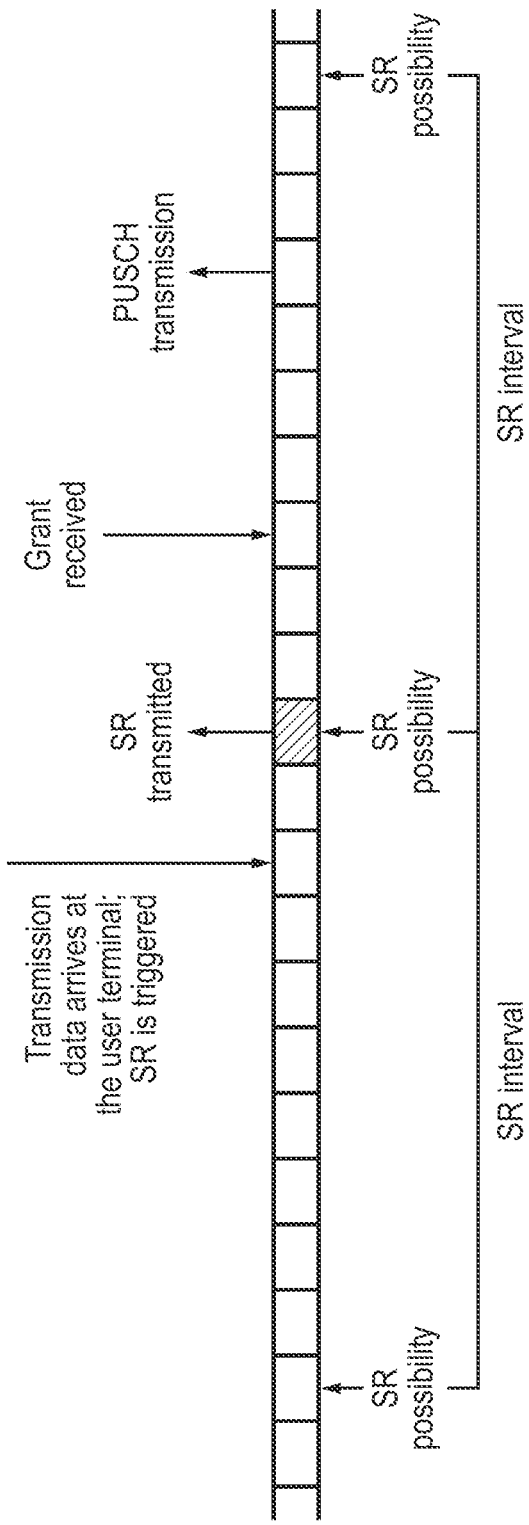

In an LTE system of FIGS. 2 and 3, the eNodeB sends control channel messages on PDCCH to the UEs in order to control the use of transmission resources in time, frequency, code and spatial domains for transmission to and from the UEs. A radio resource in the time domain is defined with respect to the timing of the transmission of the signal on the radio resource. A PDCCH message indicates whether the data transmission will be in the uplink using PUSCH or downlink using PDSCH. It also indicates the transmission resources, and other information such as transmission mode, number of antenna ports, data rate, number of codewords enabled. In addition the PDCCH message indicates which reference signals may be used to derive phase reference(s) for demodulation of a DL transmission. Reference signals for different antenna ports, but occupying the same locations, are distinguished by different spreading codes. The eNodeB obtains information on the downlink (DL) channel by means of CSI reports transmitted by the UE, and obtains information on the uplink (UL) channel by making channel measurements using SRS transmitted by the UE.

In order to allocate appropriate resources by scheduling UL transmissions from UEs with appropriate transmission parameters and resources, when no PUSCH resources are available a scheduling request is triggered in the UE of the LTE system of FIGS. 2 and 3. PUCCH resources for SR are defined in terms of resource index which indicates the resource within a subframe and a configuration index which indicates the periodicity of occurrence of subframes in which the resource is available, together with an offset which indicates the position of the subframe within the period. For UEs with more than one antenna port in the UL, different PUCCH resources can be defined for each antenna port.

Resources and other parameters for an aperiodic SRS which is triggered via PDCCH in the LTE system of FIGS. 2 and 3 are periodicity (in subframes), subframe offset, antenna ports, bandwidth, frequency domain position, transmission comb, and cyclic shift.

In the following embodiments of the present invention are described with reference to FIGS. 4 to 11. The embodiment particularly relate to transmitting a radio resource allocation message from the user terminal to the base station wherein the message includes information about the resources to be used for transmission of channel information and/or information about the resources to be used for transmission of data. Thus, in a preferred embodiment, the triggering of a scheduling request at the user terminal also triggers the transmission of either, or both of, a sounding reference signal (SRS) or data (PUSCH).

FIGS. 4a to 4d illustrate SR and SRS transmissions in accordance with embodiments of the present invention.

Figure 4A:
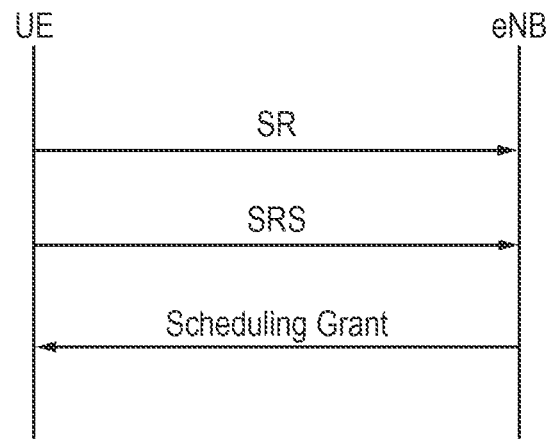
Figure 4B:
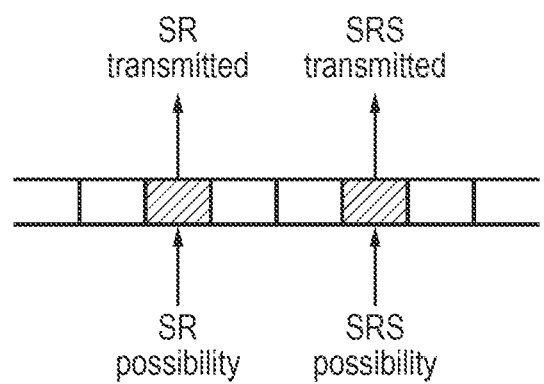

In an embodiment as illustrated in FIG. 4a, the UE is configured with dedicated PUCCH resources that it uses when a scheduling request is triggered. The UE is also configured with dedicated SRS resources/parameters which it uses when the network triggers an aperiodic SRS transmission. When a scheduling request is triggered, the UE transmits SR on the first available PUCCH resources for SR, and then SRS on the first available resources for aperiodic SRS after the SR transmission as illustrated in FIG. 4b. The SRS provides the network with early information on UL channel conditions. When the network receives the SR it is aware that the UE will also send SRS, and can avoid requesting any other UEs to send SRS which may collide in the same resources. To facilitate this, a minimum time delay may be arranged between SR and SRS which may be defined by specification or configuration.

FIG. 4a illustrates that eNB transmits a scheduling grant to the UE in response to the SR. However, in other embodiments, the eNB may not respond to a SR at all, but only await the SRS and optionally other signalling from the UE. Also, in further preferred embodiments, the eNB may respond with a scheduling confirmation, forbiddance or a scheduling re-allocation, for example, in response to a data transmission from the UE. Thus, the expressions "scheduling grant", "scheduling confirmation", "scheduling forbiddance" and "scheduling re-allocation" may be exchanged in preferred embodiments for notifying the user terminal about the scheduling grant, confirmation, forbiddance and/or re-allocation.

In another embodiment which is not shown, multiple UEs may be configured with SRS resources/parameters which overlap. Since UEs with potentially interfering SRS resources/parameters are allocated different SR resources, the effect of collisions (i.e. interfering SRS transmissions from different UEs) is mitigated. The network is able to identify collision cases and may ignore the SRS transmissions from different UEs.

In another embodiment which is not shown, multiple UEs may be allocated the same SR resources. To reduce collision of SRS, UEs with SR resources in the same subframe are configured with non-interfering SRS resources/parameters. The network is thus able to identify UEs transmitting on the same SR resources from the different received SRS. The network may differentiate between colliding SRS based on, for example, different scrambling, precoding etc. In another embodiment, this could also be facilitated if SRS transmissions from UEs using SR resources in different subframes (e.g. in adjacent or successive subframes) are also arranged to not overlap.

Figure 4C:
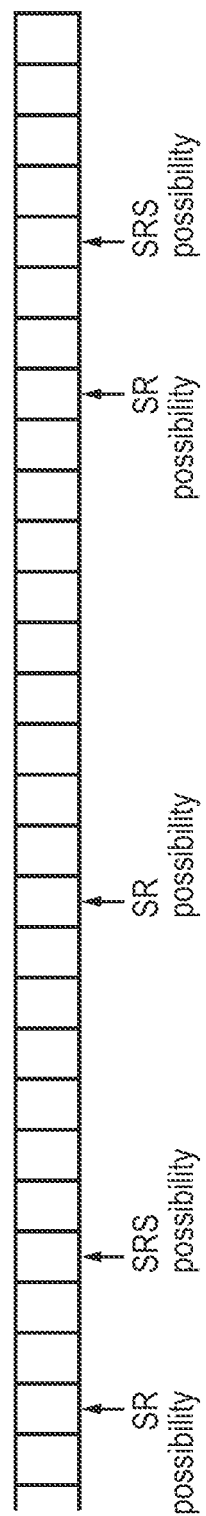

In another embodiment illustrated in FIG. 4c, only a subset of possible SR transmission instances lead to transmission of SRS. For example, the UE may be configured to only transmit SRS corresponding to SR in a particular subset of subframes (e.g. every Nth subframe with a given time offset). This may reduce the potential collision with SRS from other UEs.

Figure 4D:
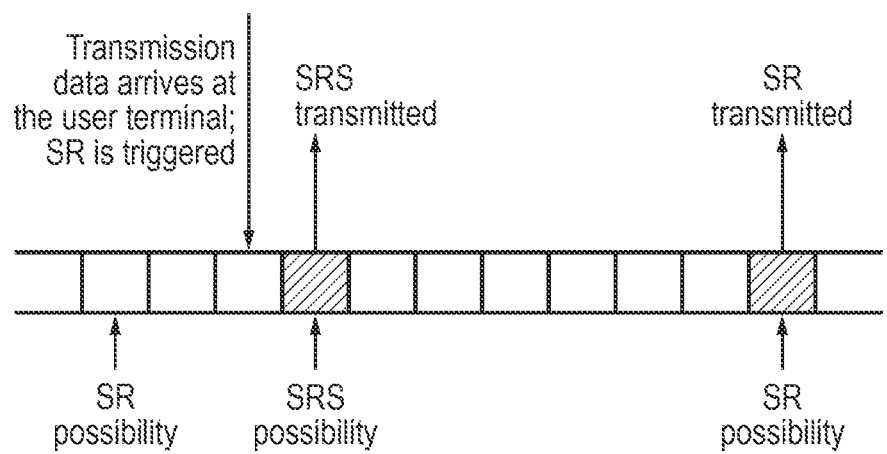

In another embodiment illustrated in FIG. 4d, the transmission of SRS occurs on the first available SRS resource after the scheduling request is triggered. This means that depending on the resource configuration and timing of the scheduling request, SR and SRS can be transmitted in any order and also in the same subframe. This minimises delay. It is preferred that the network is configured to be prepared for receiving the SRS at any time.

Figure 5:
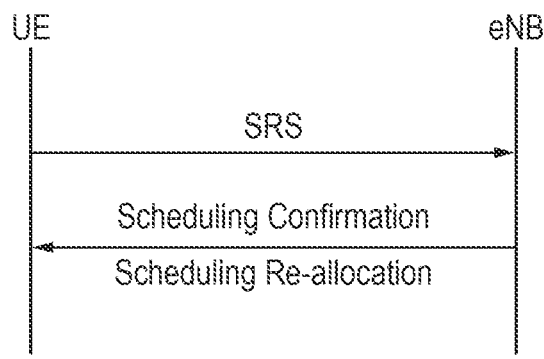
FIG. 5 illustrates SRS transmission only in accordance with embodiments of the present invention.

FIG. 5 illustrate SRS transmission only in accordance with another embodiment of the present invention. The features as described with reference to FIGS. 4a to 4d may be applied to the embodiment illustrated in FIG. 5 as well except that only SRS is transmitted, but no SR. Therefore, "SR" is indicated by "SRS" with preferably suitable parameters. This has the advantage that no SR resources are needed.

Figure 6A:
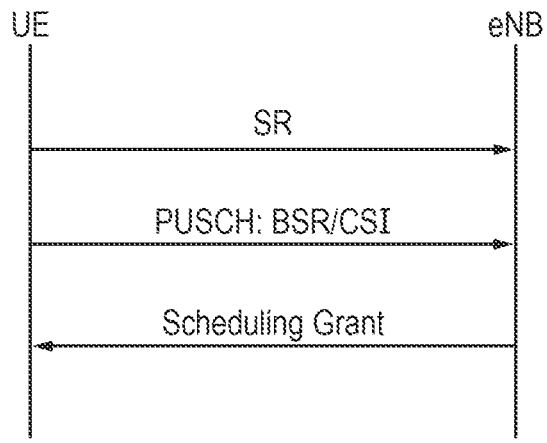
FIGS. 6a to 6b illustrate SR and PUSCH transmissions in accordance with embodiments of the present invention.
Figure 6B:
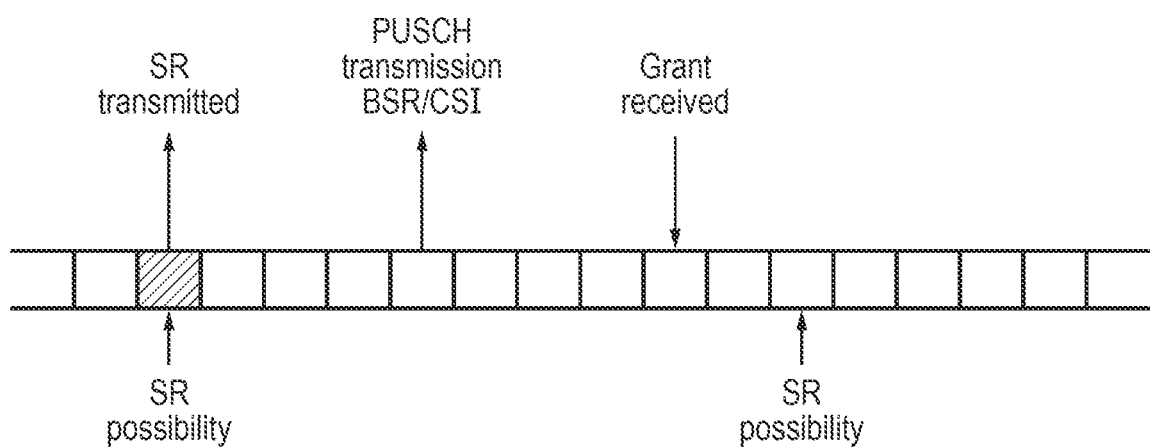

FIGS. 6a to 6b illustrate SR and PUSCH transmissions in accordance with embodiments of the present invention. The UE is configured with dedicated PUCCH resources for SR when the SR triggered. The UE is also configured with PUSCH resources/transmission parameters. For the embodiments illustrated in FIGS. 6a and 6b, it is assumed that any granted PUSCH resources would be enough to allow transmission of BSR. When a scheduling request is triggered, the UE transmits SR on the first available PUCCH resources for SR, and then PUSCH on the first available resources after the SR transmission. The PUSCH contains BSR, providing the network with early information on UE buffer status. Potential delay is reduced by not waiting for a PUSCH allocation signalled on the PDCCH. When the network receives the SR it is aware that the UE will also send PUSCH, and can avoid requesting any other UEs to send PUSCH which may collide in the same resources. To facilitate this, a minimum time delay may be arranged between SR and PUSCH. The time delay may be specified or configured. For LTE-based systems, this time is preferably at least 4 subframes, i.e. 4 ms, as illustrated in FIG. 6b. However, any other number of subframes may be preferred as well.

In another embodiment which is not shown, multiple UEs may be allocated the same SR resources. To reduce collision of PUSCH, UEs with SR resources in the same subframe are configured with non-interfering PUSCH resources/parameters.

In another embodiment which is not shown, the PUSCH resources/transmission parameters to be used are the same as in the most recently uplink grant received by the UE (e.g. via PDCCH). Alternatively, a default set of parameters may be configured, for example based on the UE ID.

In another embodiment which is not shown, an aperiodic CSI report is also triggered and carried on the PUSCH. The CSI report format (if required) may be configured by higher layer signalling. This provides the network with early CSI ready for any subsequent DL transmission.

Figure 7:
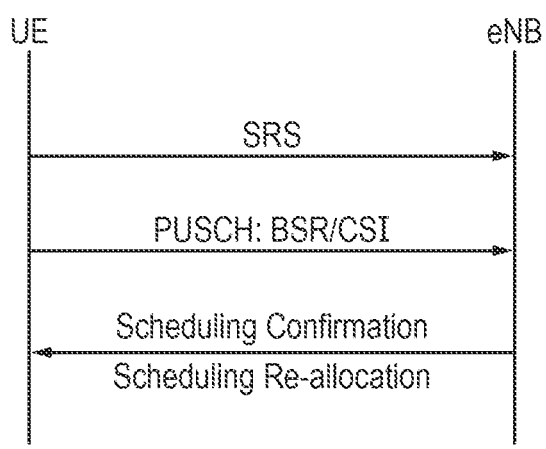
FIG. 7 illustrates SRS and PUSCH transmission in accordance with embodiments of the present invention.

FIG. 7 illustrate a SRS and PUSCH transmission in accordance with another embodiment of the present invention. The features as described with reference to FIGS. 6a to 4b may be applied to the embodiment illustrated in FIG. 7 as well except only SRS is transmitted, instead of SR.

Figure 8A:
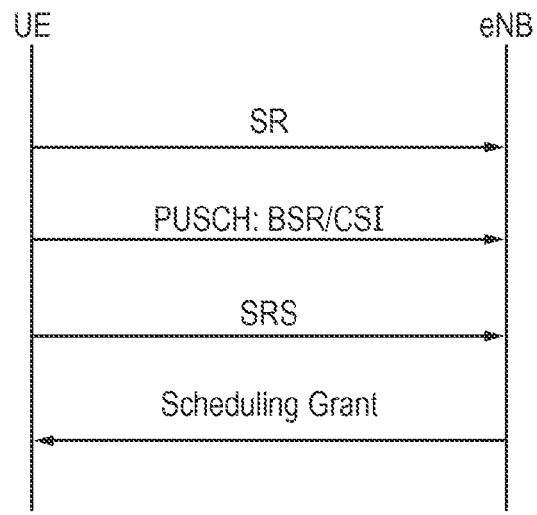
FIGS. 8a to 8b illustrate SR, SRS and PUSCH transmissions in accordance with embodiments of the present invention.
Figure 8B:
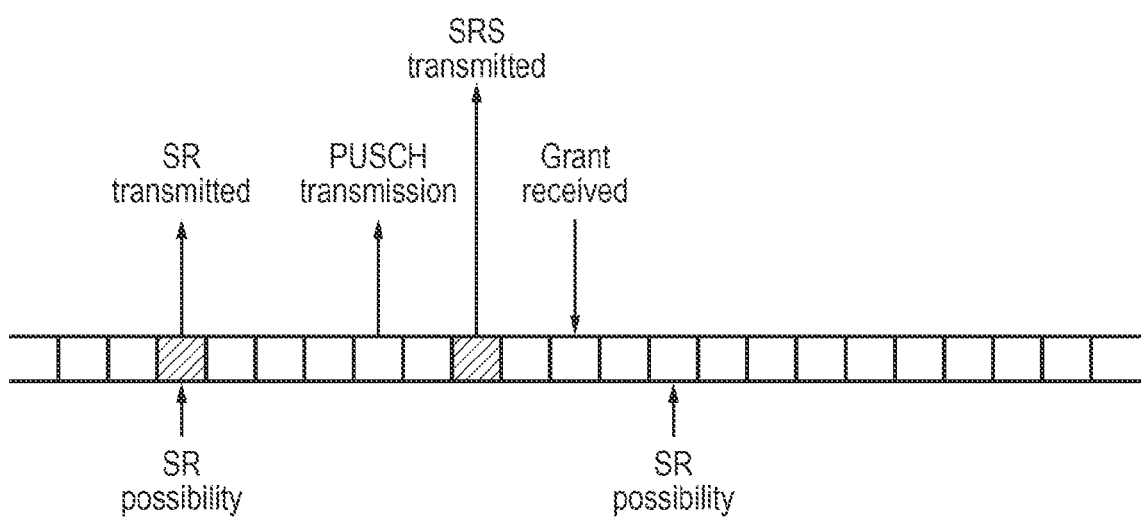

FIGS. 8a to 8b illustrate a SR, SRS and PUSCH transmission in accordance with another embodiment of the present invention. Features of the above embodiments may be combined with the embodiment shown in FIGS. 8a and 8b. In the embodiment shown in FIGS. 8a and 8b, SR is triggered and transmitted. The SR transmission is followed by PUSCH after a suitable delay of, for example, 4 subframes and SRS for which the delay may be longer, depending on available resources.

Other embodiment which are not shown refer to the use of the SR value to indicate triggering of, preferably, SRS or PUSCH, which is described below. In LTE-based systems, a positive SR is typically indicated (at least in the absence of a simultaneous ACK/NACK transmission) by the presence of a particular BPSK symbol value. A negative SR (i.e. no SR) is indicated by no transmission.

In embodiments of the present invention which may be combined with the embodiments described above, a modified SR transmission of the preferred embodiment may indicate two different setups by different values of the BPSK symbol:
Indication of positive SR only
Transmission of SRS (and/or PUSCH)

Similarly, buffer status may be indicated instead of the transmission of SRS (and/or PUSCH).

In a variation of these embodiments, a QPSK symbol of the modified SR transmission of the preferred embodiment may be used to indicate one of up to 4 different setups from among, for example,
SR only
SRS only
PUSCH only
    PUSCH with CSI
    PUSCH without CSI
PUSCH and SRS
Buffer status
SRS and Buffer status As a further variation of these embodiments, only a subset of possible SR transmission instances is used for the modified SR transmission of the preferred embodiment. For example, the UE may be configured to only transmit a modified SR of the preferred embodiment in a particular subset of subframes, for example every Nth subframe with a given time offset.

Other embodiment which are not shown refer to the indication of buffer status by radio resource allocation messages transmissions in accordance with the embodiments of the present invention, which is described below.

Alternatively or in addition to the features of the above embodiments, the resources and transmission parameters/configurations for the various signals may be configured by higher layer signalling. Where more than one possible resource/configuration/parameter set is available, for example for SRS, the one chosen or the combination chosen, for example SR+SRS or SR only, by the UE may indicate additional information, such as the amount of data in the UE buffer, or priority of such data. As an example signalling SR+SRS, instead of SR only, may indicate more, or higher priority, data at the UE than signalling SR only.

In a preferred embodiment, a UE with more than one UL antenna port may be configured to transmit SR on different resources for each antenna port. Therefore, since the signal on each antenna port (if transmitted) can indicate either positive or negative SR, multiple combinations are possible when a scheduling request is triggered. These can be used to indicate different buffer status. This aspect is preferably used with the features of the embodiments above, but may also be applied independently thereof. Thus, the radio resource allocation message may also be understood to be transmitted on different antenna ports, thus indicating channel or transmission data information to the base station.

In a further embodiment, different UEs, for example each with two antenna ports, may be configured with different pairs of SR resources. Configuring different SR resources for different antenna ports may thus be used as a method of distinguishing SR transmissions from different UEs when the same set of SR resources are shared between multiple UEs.

In a further embodiment, information on buffer status is indicated by a sequence of SR (and/or SRS) transmissions, for example by the previous two instances transmitted. Different buffer status values (or priorities) may be indicated by an alternating sequence of SR signals (e.g. positive and negative) to distinguish this signal from SR signals in LTE which are retransmitted (with the same value, that is, for example, all positive) if a PUSCH allocation is not granted by the network.

Embodiments may also be applied for multiple carriers, i.e. carrier aggregation. In this case, information about buffer status could be indicated by a particular combination of SR (and/or SRS) transmissions on different carriers.

In embodiment, the buffer status indicated using the above methods may be limited to only a few bits. Thus, the indicated buffer status value is a coarsely quantized version of the amount of data in the buffer (for example, 4 levels indicated by 2 bits) or determined according to whether the amount of data in the buffer exceeds a threshold or not (for example, indicated by 1 bit).

Embodiment of the invention are described above with reference to LTE FDD, but aspects of the invention may also be applied for LTE TDD, and to other communications systems such as, for example, UMTS.

In the above embodiments, it is assumed that the UL and DL carriers are paired. However, aspects of the invention may also be applied to an asymmetric number of UL and DL carriers or asymmetric UL and DL bandwidths.

In the above embodiments, it is assumed that a scheduling request is indicated by SR transmission, but the invention may also be applied if a scheduling request is indicated by a different signal.

The subframes available for possible transmission of SR and SRS may be more frequent than indicated in the Figures, which would shorten the apparent time delay (timing offset) between data arrival and data transmission. Also, the delays or offset between the subframes of, for example, SR and SRS may be different from those as illustrated in the exemplary Figures.

The reception of SR by the network would typically have a low error rate. This means that occasions would occur only infrequently where the UE transmits SR (indicating a second signal such as SRS or PUSCH) and the SR is not received by the network. Hence, the potential interference resulting from the network not being aware of the second signal, and scheduling other uplink transmissions in the same resources, can be reduced.

Figure 9A:
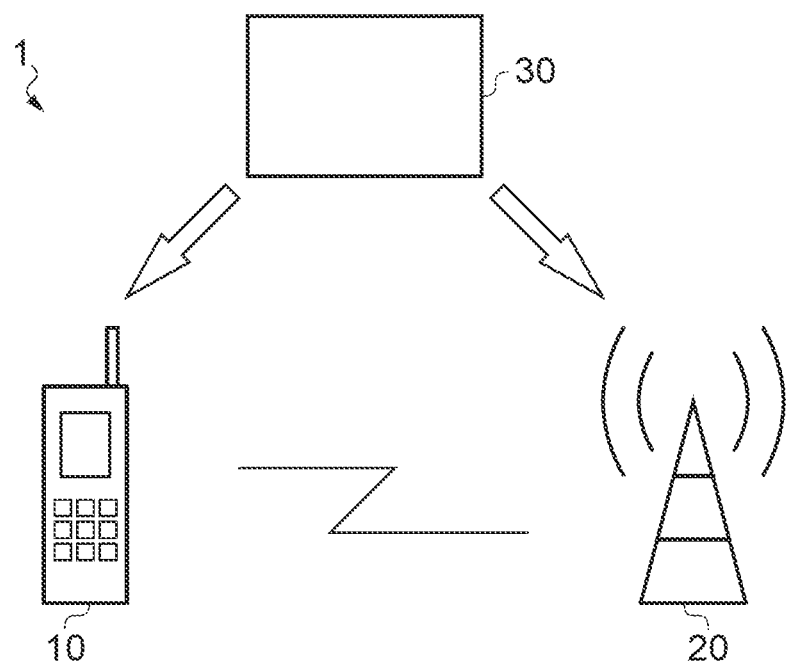
FIGS. 9a to 9b illustrate a mobile communication system and a controller in accordance with an embodiment of the present invention.

FIG. 9a illustrates a mobile communication system 1 comprising a terminal 10, a base station 20 and a controller 30 in accordance with an embodiment of the present invention. The UE 10 is adapted to communicate with the base station 20 and, in particular, to transmit transmission data on the uplink to the base station 10. The UE 10 may be pre-configured for any of the above embodiments by preferably higher layer signalling, for example, RRC signalling. The UE 10 may be controlled to carry out the method according to an aspect of the invention by a controller 30 comprised in the UE 10 itself, in the base station 20 or in a network entity (not shown).

Figure 9B:
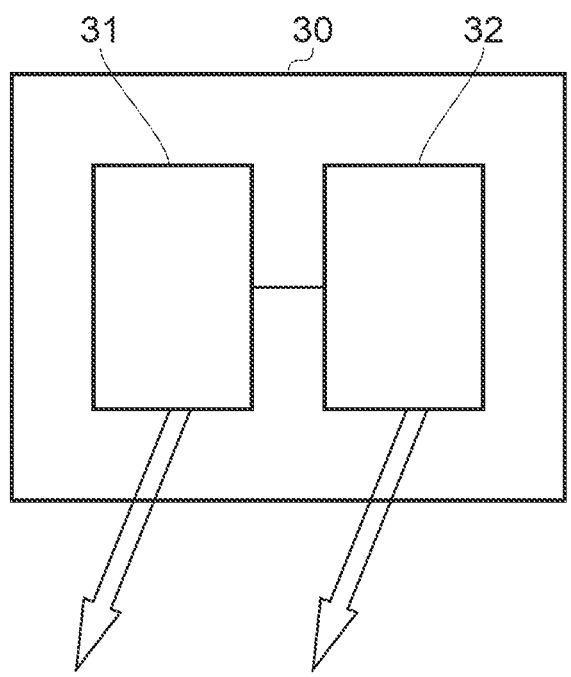

FIG. 9b illustrates a controller in accordance with an embodiment of the present invention. The controller 30 is adapted for controlling transmission in the mobile communication system 1. The controller 30 (or sub-units 31, 32, and/or 33 which are described in the following) may be included in the user terminal 10, the base station 20 and/or the network. The controller 30 comprises a message transmission controller 31 which is adapted for controlling the transmission of a message from the terminal to the base station, wherein the message indicates that an uplink transmission resource is to be used by the terminal 10. The controller 30 further comprises an further information provision controller 32 for controlling a provision of further information by the terminal 10 to the base station 20.

Figure 10:
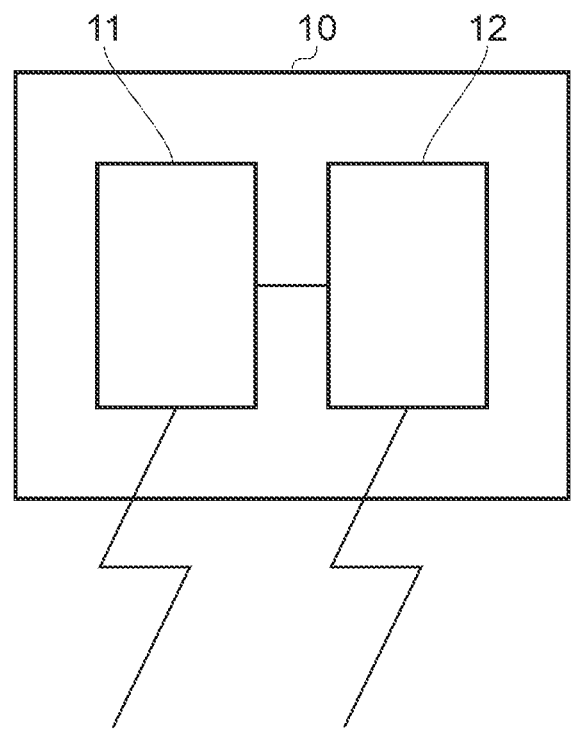
FIG. 10 illustrates a user terminal in accordance with an embodiment of the present invention.

FIG. 10 illustrates a terminal 10 in accordance with an embodiment of the present invention. The terminal 10 is adapted for transmitting transmission data to the base station 10. The terminal 10 comprises a message transmitter 11 for transmitting a message from the terminal 10 to the base station 20, wherein the message indicates that an uplink transmission resource is to be used by the terminal 10, and a further information provider (12) for providing further information by the terminal 10 to the base station 20.

Figure 11:
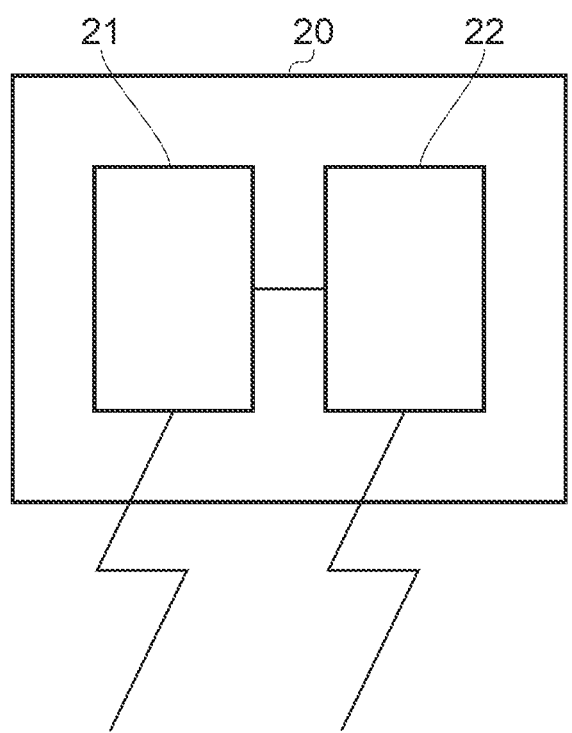
FIG. 11 illustrates a base station in accordance with an embodiment of the present invention.

FIG. 11 illustrate a base station 20 in accordance with an embodiment of the present invention. The base station 20 is adapted for receiving transmission data from the terminal 10. The base station 20 comprises a message receiver 21 for receiving a message from the terminal 10, wherein the message indicates that an uplink transmission resource is to be used by the terminal 10, and a further information receiver 22 for receiving further information provided by the terminal 10 to the base station 20.

What is claimed is:

1. A transmission method in a mobile communication system comprising a base station and a terminal, the method comprising:
   transmitting by the terminal a message to the base station indicating that an uplink transmission resource is to be used by the terminal;
   providing by the terminal further information to the base station without use of control signalling from the base station to allow transmission of the further information,
   wherein, when a second terminal transmits a second message to the base station indicating that a second uplink transmission resource is to be used by the second terminal and second further information is provided by the second terminal to the base station, the method further comprises at least one of:
   allocating message resources for the message of the terminal and for the second message of the second terminal to be different from each other if further information resources of the further information of the terminal and of the second further information of the second terminal overlap with each other;
   configuring the further information resources for the further information of the terminal to be non-interfering with the second further information of the second terminal when message resources of the message of the terminal and the second message of the second terminal overlap with each other; and
   configuring the further information resources for the second further information of the second terminal to be non-interfering with the further information of the terminal if message resources of the message of the terminal and the second message of the second terminal overlap with each other.

2. The method of claim 1, wherein the further information is provided to the base station by a pre-configured transmission from the terminal to the base station.

3. The method of claim 1, wherein the message includes at least one of the following:
   a scheduling request (SR) requesting an allocation of an uplink transmission resource, and
   a sounding reference signal (SRS) allowing determination of channel information about an uplink channel from the terminal to the base station, and
   wherein the further information is provided by transmission of at least one of the following:
   channel state information (CSI) as channel information about a downlink channel from the base station to the terminal,
   a buffer status report (BSR) as the transmission data information about a buffer status of a transmission data buffer storing transmission data at the terminal, and/or transmission data.

4. The method of claim 1, wherein the message is a scheduling request (SR) requesting an allocation of an uplink transmission resource and the further information is provided by transmission of a sounding reference signal (SRS) allowing determination of channel information about an uplink channel from the terminal to the base station.

5. The method of claim 1, wherein the (i) transmitting the message and (ii) providing the further information are carried out in different subframes and/or with a timing offset to each other.

6. The method of claim 5, wherein the transmitting the message includes at least one of the following:
   transmitting subframe information from the terminal to the base station indicating a subframe in which the further information will be transmitted with respect to the transmission of the message, and
   transmitting offset information from the terminal to the base station indicating a timing offset of the transmission of the further information with respect to the transmission of the message.

7. The method of claim 5, wherein the subframe and/or the timing offset represents the further information.

8. The method of claim 1, wherein the transmitting the message includes providing the further information, indicated by a parameter of the message.

9. A non-transitory computer readable medium comprising program code for causing a computer to carry out the method of claim 1.

10. The method of claim 1, wherein the method further includes receiving, at the base station, transmission data transmitted from the terminal to the base station on the uplink transmission resource indicated by the further information.

11. The method of claim 1, wherein the method further includes allocating, at the base station, the uplink transmission resource on the basis of the further information and notifying the terminal about the allocated uplink transmission resource.

12. A controller for controlling a transmission in a mobile communication system comprising a base station and a terminal, the controller comprising:
   a message transmission controller for controlling a transmission of a message from the terminal to the base station, wherein the message indicates that an uplink transmission resource is to be used by the terminal, and
   a further information provision controller for controlling a provision of further information by the terminal to the base station, without use of control signalling from the base station to allow transmission of the further information,
   wherein, when a second terminal transmits a second message to the base station indicating that a second uplink transmission resource is to be used by the second terminal and second further information is provided by the second terminal to the base station, the controller is further configured for at least one of:
   allocate message resources for the message of the terminal and for the second message of the second terminal to be different from each other when further information resources of the further information of the terminal and of the second further information of the second terminal overlap with each other;
   configure the further information resources for the further information of the terminal to be non-interfering with the second further information of the second terminal when message resources of the message of the terminal and the second message of the second terminal overlap with each other; and
   configure the further information resources for the second further information of the second terminal to be non-interfering with the further information of the terminal if message resources of the message of the terminal and the second message of the second terminal overlap with each other.

13. A terminal of a mobile communication system comprising a base station and the terminal, the terminal comprising:
   a message transmitter for transmitting a message from the terminal to the base station, wherein the message indicates that an uplink transmission resource is to be used by the terminal, and
   a further information provider for providing further information by the terminal to the base station, without use of control signalling from the base station to allow transmission of the further information;
   wherein, when a second terminal transmits a second message to the base station indicating that a second uplink transmission resource is to be used by the second terminal and second further information is provided by the second terminal to the base station, at least one of: message resources are allocated for the message of the terminal and for the second message of the second terminal to be different from each other when further information resources of the further information of the terminal and of the second further information of the second terminal overlap with each other, the further information resources are configured for the further information of the terminal to be non-interfering with the second further information of the second terminal when message resources of the message of the terminal and the second message of the second terminal overlap with each other, and
   the further information resources are configured for the second further information of the second terminal to be non-interfering with the further information of the terminal if message resources of the message of the terminal and the second message of the second terminal overlap with each other.

14. A base station of a mobile communication system comprising the base station and a terminal, the base station comprising:
   a message receiver for receiving a message from the terminal, wherein the message indicates that an uplink transmission resource is to be used by the terminal, and
   a further information receiver for receiving further information provided by the terminal to the base station, without use of control signalling from the base station to allow transmission of the further information,
   wherein, when a second terminal transmits a second message to the base station indicating that a second uplink transmission resource is to be used by the second terminal and second further information is provided by the second terminal to the base station, at least one of: message resources are allocated for the message of the terminal and for the second message of the second terminal to be different from each other when further information resources of the further information of the terminal and of the second further information of the second terminal overlap with each other, the further information resources are configured for the further information of the terminal to be non-interfering with the second further information of the second terminal when message resources of the message of the terminal and the second message of the second terminal overlap with each other, and
   the further information resources are configured for the second further information of the second terminal to be non-interfering with the further information of the terminal if message resources of the message of the terminal and the second message of the second terminal overlap with each other.

* * * * *